United States Patent Office 3,458,970
Patented Aug. 5, 1969

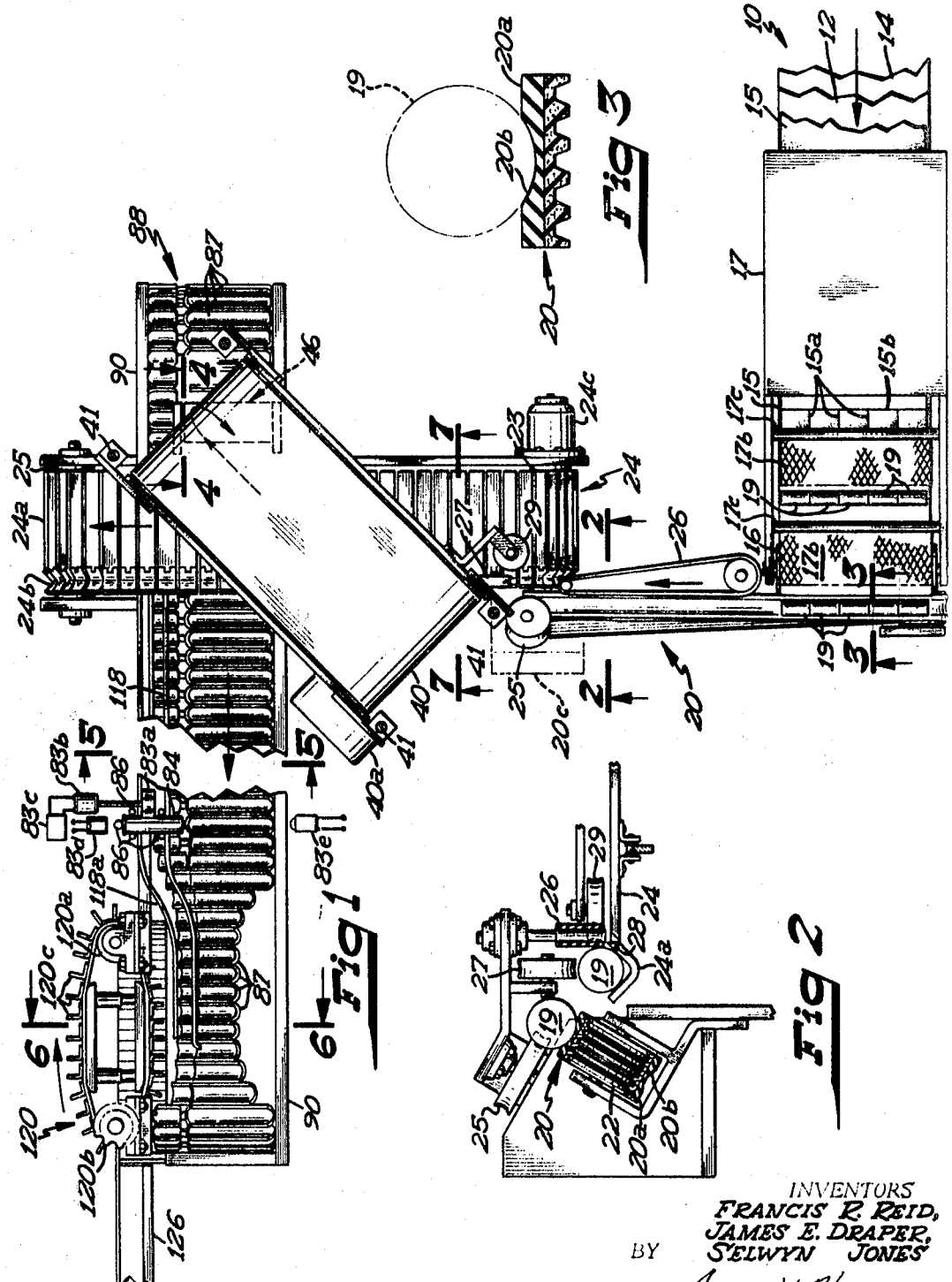

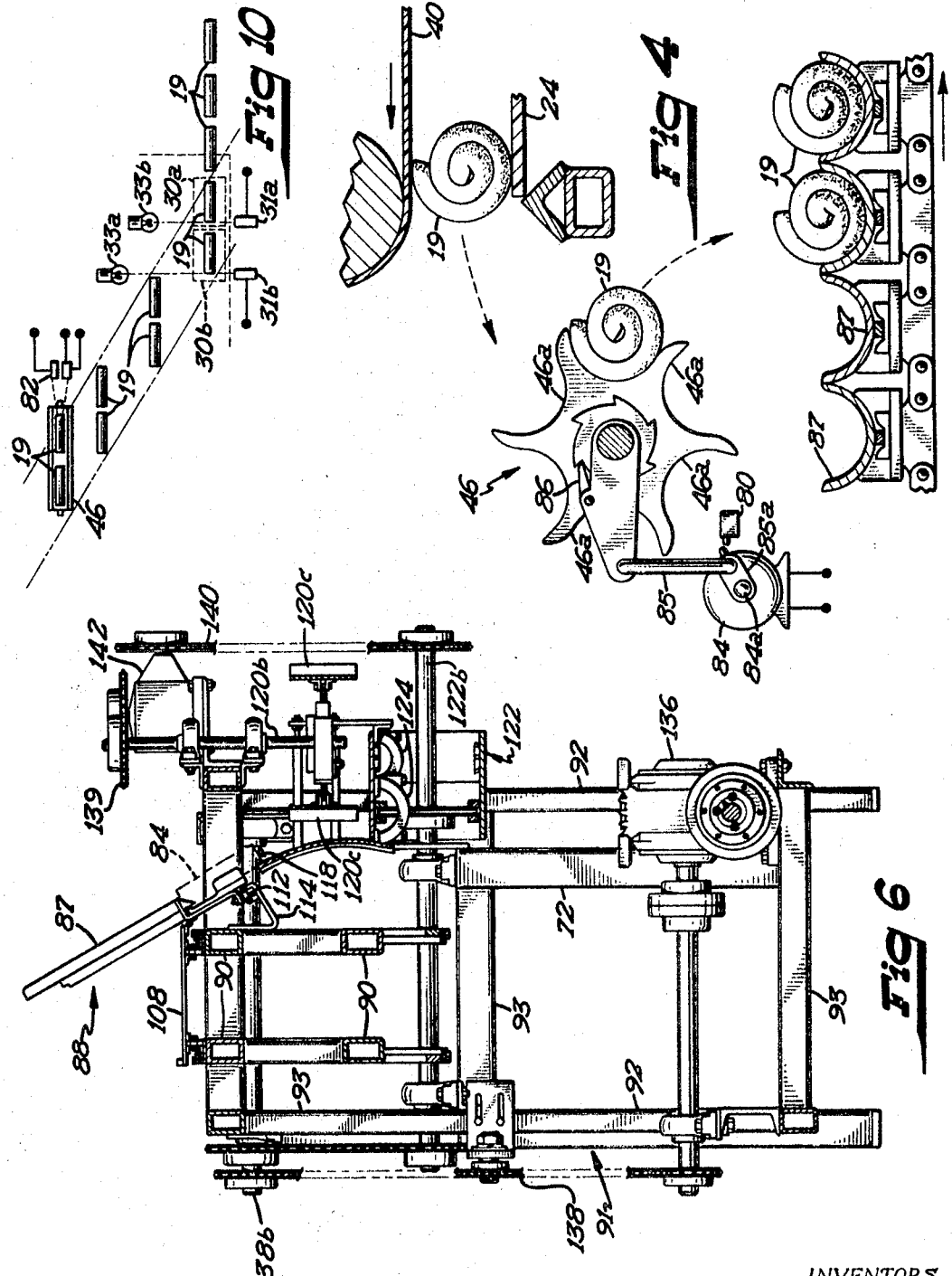

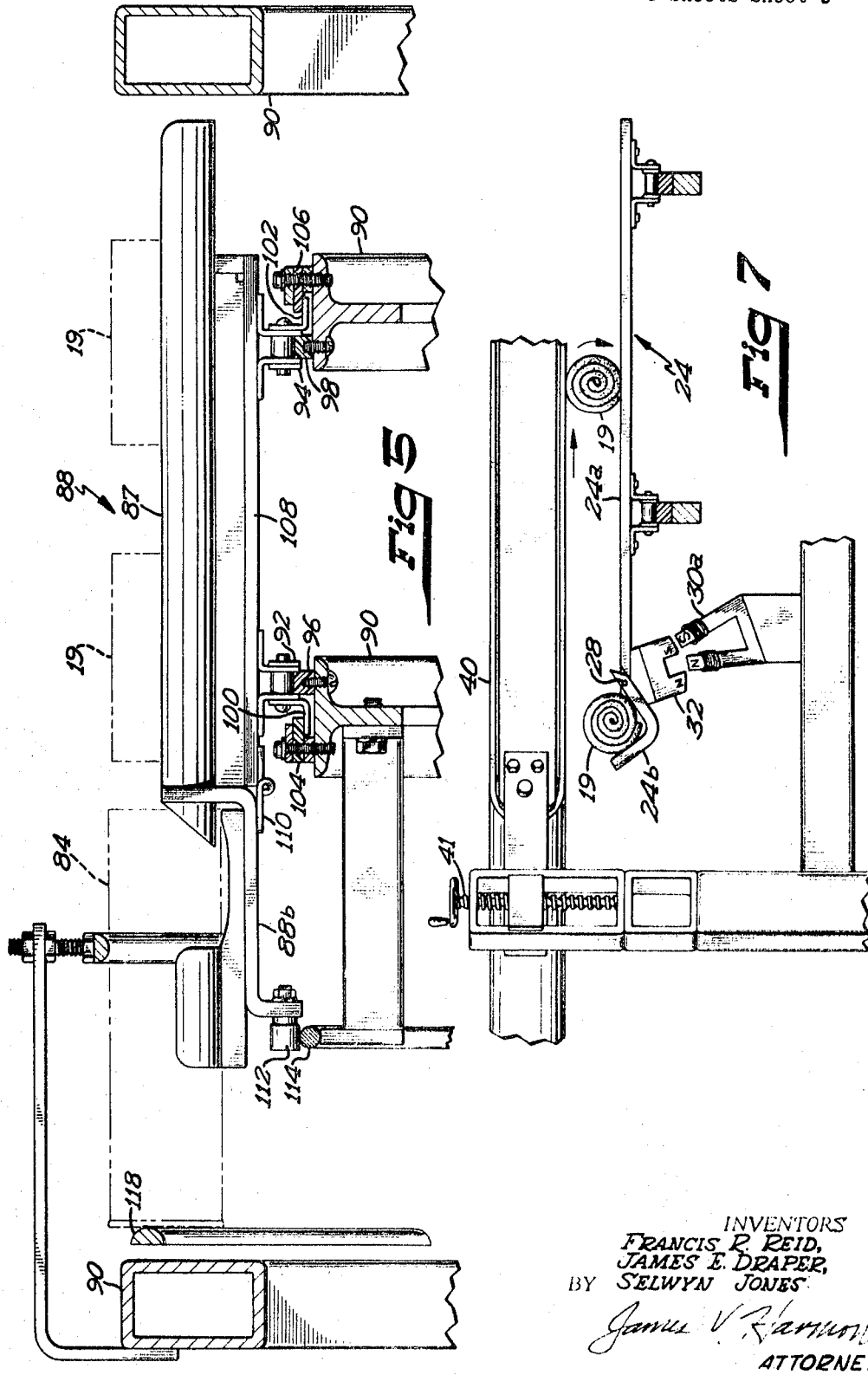

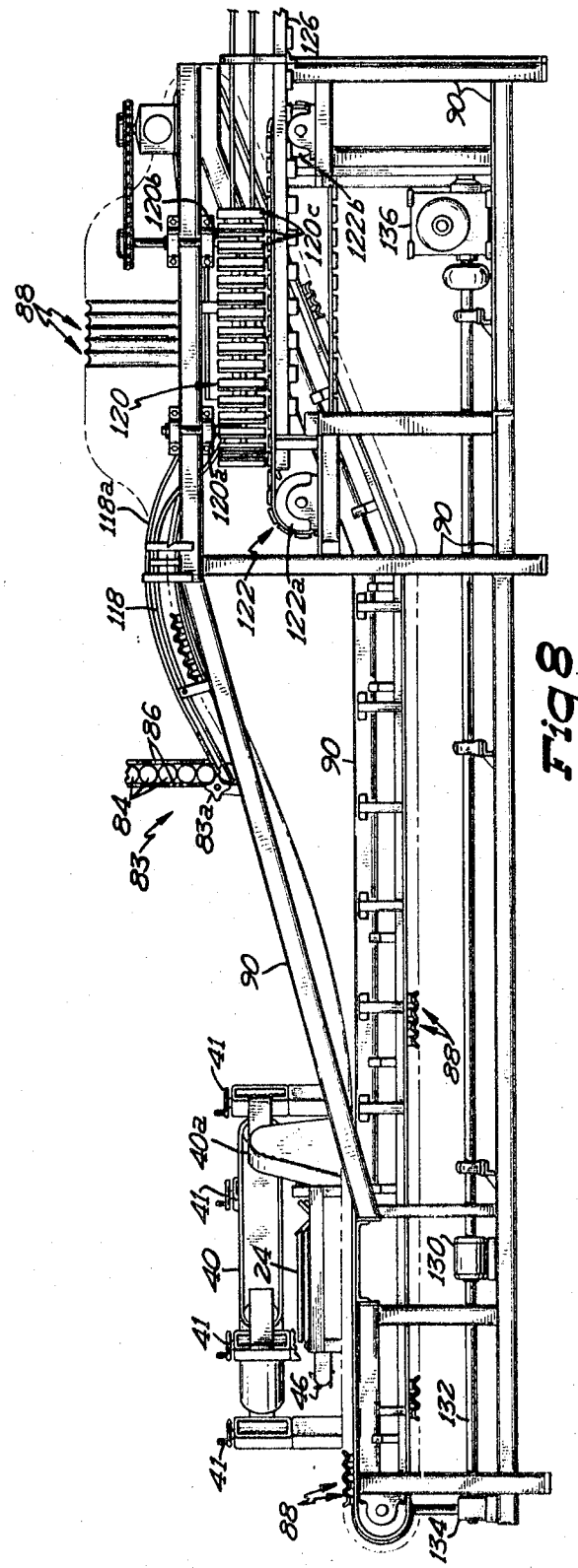

1

3,458,970
DOUGH PACKING APPARATUS
Francis R. Reid, James E. Draper, and Selwyn Jones, Minneapolis, Minn., assignors to The Pillsbury Company, Minneapolis, Minn., a corporation of Delaware
Filed Oct. 24, 1966, Ser. No. 588,843
Int. Cl. B65b 35/44, 57/12, 63/04
U.S. Cl. 53—159                                         6 Claims

ABSTRACT OF THE DISCLOSURE

An apparatus for loading rolled up cylinders of dough into cans. It includes a pair of vertically disposed obliquely related conveyors. The upper conveyor travels at an appropriate speed to roll the dough cylinders when placed on the lower conveyor from one edge of the lower conveyor to the other edge at which point each roll is free to fall onto a series of loading spoons mounted on a third conveyor in side-by-side relationship. At one point in the third conveyor, the spoons are tipped to slide the dough rolls into the cans aligned with the ends of the spoons.

---

The present invention relates to packing equipment useful for packing delicate objects such as dough products. More specifically, the invention relates to the packing of dough products in cans. It is particularly well suited for packing relatively large pieces of dough such as rolled, unbaked dough products in pressure-retaining cans.

Of the packing devices suited for inserting delicate objects such as unbaked dough products into cans, many are suited only for inserting from about 6 to 12 relatively flat and thin disc-shaped dough pieces in each can. Others are suited only for inserting wrapped dough pieces or products having a considerable amount of strength or those which are unlikely for some other reason to be deformed during the packing operation. Still other packing devices are incapable of relatively high-speed operation and are accordingly unsuited for use in modern dough packing operations in which as many as about ten packages are filled per second.

In view of the deficiencies of the prior art, one object of the present invention is to provide an improved apparatus for reliably packing relatively delicate objects such as a roll of dough into a container without a tendency for the dough to be either deformed or unrolled during the packing operation.

Another object is to pack relatively delicate objects at high speed without applying pressure for inserting it into the container.

A still further object of the invention is the provision of an improved packing apparatus in which the pieces that are to be packed are first oriented with respect to the cans that are to be filled so that the opening of each can is positioned to receive the pieces which are then allowed to fall into the can under the influence of gravity.

A more specific object of the invention is the provision of an improved packing apparatus including a combination supporting and guiding means for holding the pieces that are to be packed and a provision for orienting the cans relative to the supports so that the cans will receive the pieces when the supports are tilted.

A further object of the invention is the provision of an improved packing apparatus suited for receiving groups of dough pieces such as five or six longitudinally aligned cylindrical pieces of dough, for dividing these larger groups of pieces into smaller groups, as for example into pairs and for packing each pair in a single container with a provision being made for packing single dough pieces in each container when desired.

Still another object of the invention is the provision of an improved dough packing apparatus including a means for receiving randomly spaced dough pieces, arranging the pieces into groups of two and packing each pair into a receptacle without causing the dough to become deformed or unrolled.

Still another object of the invention is the provision of an improved dough packing apparatus including a can supplying mechanism, supports for carrying the dough pieces and a means for interrupting the can supply mechanism when a dough piece is inadvertently missing from one of the supports.

These and other more detailed and specific objects will be apparent from the accompanying specification and drawings wherein:

FIGURE 1 is a plan view of the apparatus embodying the invention.

FIGURE 2 is a vertical sectional view taken on line 2—2 of FIGURE 1 on a larger scale.

FIGURE 3 is a vertical sectional view taken on line 3—3 of FIGURE 1 on a somewhat larger scale.

FIGURE 4 is a vertical sectional view taken on line 4—4 of FIGURE 1 on a greatly enlarged scale.

FIGURE 5 is a vertical sectional view taken on line 5—5 of FIGURE 1 on a greatly increased scale.

FIGURE 6 is a vertical sectional view taken on line 6—6 of FIGURE 1 on a greatly enlarged scale.

FIGURE 7 is a vertical sectional view taken on line 7—7 of FIGURE 1 on a greatly enlarged scale.

FIGURE 8 is a side elevational view of the apparatus of FIGURE 1.

FIGURE 10 is a schematic diagram in plan view of the dough pieces entering the apparatus.

Figure 11:
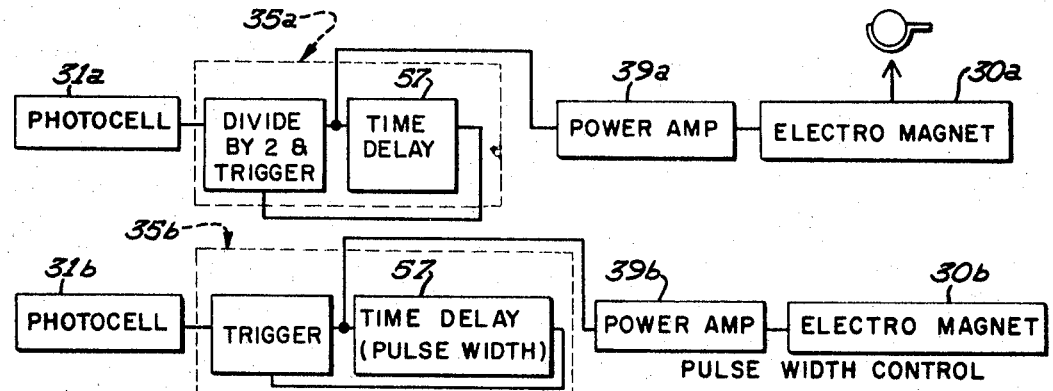
FIGURE 11 is an electrical block diagram of a control used for operating the indexing drum.

Briefly, a preferred form of the present invention includes a means for rolling and slitting a dough sheet to form a plurality of longitudinally aligned adjacent rolls of dough. Of course, when the apparatus is used for packing food products other than rolls, this mechanism can be eliminated. The apparatus also includes a receiving means for grouping the dough pieces, for example, in pairs and for providing a predetermined spacing between single pieces. In a preferred form of the invention, the grouping mechanism includes a pair of vertically spaced endless conveyors with receiving cups on one of the side edges of the lower conveyor for initially holding the pieces. The upper conveyor is obliquely mounted and is adapted to contact the upper surfaces of the pieces located in the cups when they have reached a predetermined position and thereafter roll them to the lower conveyor to the opposite edge thereof. From the edge of the lower conveyor the products fall to an indexing drum which in turn retains them for a predetermined period of time and then transfers them to one of several supporting and guiding spoons mounted on an endless loading conveyor. The loading conveyor includes a provision for supporting cans in position to receive the rolls as they move along the axis of the spoon. In a preferred form of the invention, the guide is trough-shaped and mounted for pivotal movement whereby the spoons can be tilted to transfer the rolls by gravity from the spoons into the cans. The filled cans are then removed from the apparatus and capped conventionally.

A preferred form of the invention will now be described by ways of example in packing pairs of cylindrical dough rolls into cylindrical paperboard cans.

Roll forming mechanism

As can be seen in FIGURE 1, there is provided a horizontally disposed and endless belt conveyor 10 including an upper belt section 12 and a lower belt section 14 entrained at the left end over an idler roll 16. The roll supporting the right end of the conveyor 10 has not been shown. An endless strip of dough 15 prepared in any conventional manner is fed to the conveyor 10 at a constant speed and is cut both longitudinally and transversely at evenly spaced locations 15a and 15b respectively by a cutter 17 also of known construction. The resulting dough pieces then passes under sheets of flexible material such as canvas sheets 17b suspended at the right end as seen in FIGURE 1 by means of stationary bars 17c. The sheets 17b engage the dough strips and form them as they travel on the conveyor 10 from right to left in FIGURE 1 into cylindrical rolls 19. The completed rolls 19 fall in groups of five from the left end of the conveyor 10 onto a relatively narrow endless belt conveyor 20.

Roll grouping mechanism

The smaller belt conveyor 20 is provided with a flexible upper layer 20a as seen in FIGURE 3 having a longitudinally extending groove 20b for holding the rolls 19 securely in place. The conveyor 20 is mounted for transferring the pieces in a horizontal plane at right angles to the direction of travel of the conveyor 10. As a result, the pieces 19 will be oriented in longitudinally aligned end-to-end relationship. The conveyor 20 includes a pair of supporting sheaves 21 and 22, the latter being inclined slightly so as to tip the portion of the belt 20 extending over the sheave 22 to one side (toward the right as seen in FIGURE 1) thereby causing the pieces 19 to fall onto a receiving means comprising a horizontally disposed endless slat conveyor 24 supported upon spaced apart parallel rolls 23 and 25. The conveyor 24 is formed from an endless chain entrained over the rolls 23 and 25 to which is secured a plurality of parallel and transversely extending slats 24a. Each of the slats has secured to its left end a cup 24b. As can be clearly seen in FIGURE 7, the cups 24b are mounted for pivotal movement about horizontally disposed axis 28 at the end of each of the slats 24a. The cups 24b are positioned to receive the pieces 19 as they leave the conveyor 20. When the pieces fall onto the cups, they will be in a retracted or lowered position as best seen in FIGURE 7.

Three idler rolls 25, 27 and 29 are used to help guide the pieces 19 as they transfer from the conveyor 20 to the conveyor 24. An additional endless belt conveyor 26 is positioned adjacent the conveyor 20 to assist in supporting the pieces 19 until they reach the conveyor 24. The conveyor 24 travels somewhat faster than the conveyor 20 thereby spacing the rolls 19 by a predetermined interval. The conveyors 20, 24 and the conveyor 40 to be described below are driven by motors 20c, 24c and 40a, respectively.

The cups 24b are raised from a retracted position shown in FIGURE 7 (the position of the cups when receiving the rolls) to an elevated position in which the rolls engaged conveyor 20 by energizing electromagnets 30a and 30b (FIGURES 7 and 10) which exert a force upon a permanent magnet 32 rigidly affixed to each of the cups 24b thereby momentarily moving each of the cups as it passes over the magnet to the raised position. The electrical circuit used for controlling the magnets 30a and 30b will be described below.

The rolls or other work pieces 19 are thus elevated by the magnets as they pass over them and as the rolls are raised their upward surfaces will contact an obliquely positioned conveyor 40 shown in FIGURES 7 and 1, the vertical position of which is adjustable as by means of screws 41 so that the lower section will contact the work pieces. The speed of the conveyor 40 is adjusted so that the lower section thereof will travel at the same speed in the direction of motion of the conveyor 24 as the conveyor 24 itself travels. In other words, the velocity component of a point travelling on the belt 40 in the same direction of motion as the belt conveyor 24 will be the same as the belt 24. Since the lower portion of the belt 40 travels from left to right as seen in FIGURE 1, it will impart a rolling motion to each piece 19 thereby causing it to travel from left to right as seen in FIGURES 1 and 7 across the upper surface of the conveyor 24.

When the work pieces 19 reach the right hand edge of the conveyor 24 they will fall as can be seen in FIGURE 4 onto a horizontally disposed indexing drum 46 provided with a plurality of trough-shaped longitudinally extending parallel and circumferentially spaced pockets 46a. The work pieces 19 will remain for a fraction of a second in the pockets 46a. The indexing drum will then be rotated about its horizontally extending central axis as described below causing the dough piece to fall to the loading mechanism which will also be described below.

Grouping control circuit

The controller for the grouping mechanism will now be described in connection with FIGURES 7, 9, 10 and 11. The object of the controller is to align the ends of the pieces 19 with the ends of the indexing drum 46 and to place the work pieces 19 in pairs aligned in end-to-end relationship on the drum 46 in the topmost trough 46a.

Figure 9:
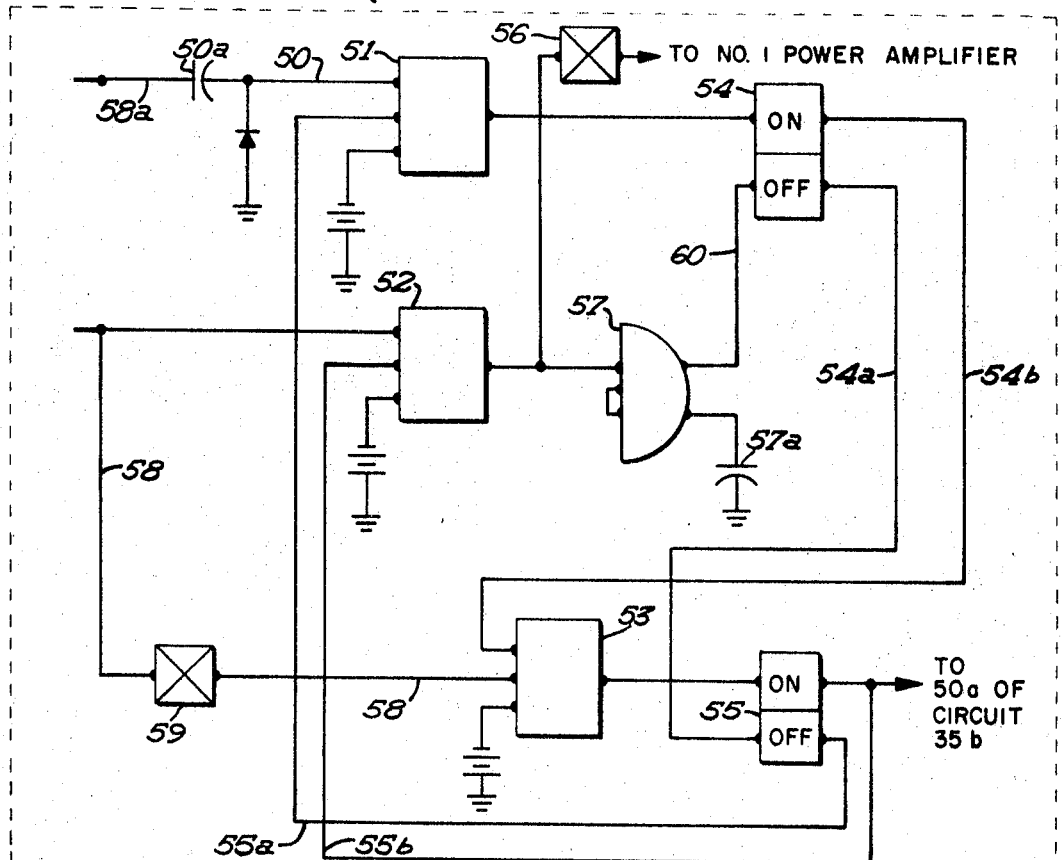
FIGURE 9 is an electrical schematic diagram of the identical circuits A and B of FIGURE 11.

The electrical circuit shown in FIGURES 9, 10 and 11 includes a pair of photocells 31a and 31b and lamps 33a and 33b. Each pair of lamps and photocells is spaced in the direction of travel of the pieces 19. Each of the photocells 31a and 31b is connected to an identical logic circuit designated 35a and 35b. These circuits function to divide the signals presented by the photocells by two and also to provide a pulse of a fixed duration to trigger the electromagnets 30a and 30b. The circuits 35a and 35b are thus wired to time delays. The circuits designated 35a and 35b are identical except as described below. For that reason only the circuit designated 35a will be described in detail. The circuits 35a and 35b are connected respectively to power amplifiers 39a and 39b. These amplifiers are in turn wired to the respective electromagnets 30a and 30b.

Reference should now be made to FIGURE 9. Each of the circuits 35a and 35b includes three "ands" 51, 52 and 53. A line 58a is wired between the photocell 31a and the "and" 51 through a differentiating capacitor 50a. The output of the "ands" 51 and 53 are wired to memories 54 and 55. The "and" 52 is wired to "not" 56 and to a pulse width timer 57 which has a timing capacitor 57a. A conductor 54a of memory 54 is wired to the "off" side of memory 55 and the "off" conductor 55a of the latter is wired to the "and" 51. The "on" conductor 54b of the memory 54 is wired to the "and" 53, the output of which is connected to the memory 55. The conductor 55b extends from the "on" side of the memory 55 to the "and" 52. Photocell 31a is also connected by wire 58 through "not" 59 to "and" 53. The time delay 57 is connected to the "off" side of the memory 54 by a conductor 60.

When the system is in use, the photocell 31a will be actuated first causing a short pulse to enter through conductor 50. It will be assumed that the memory units 54 and 55 are "off." There will then be a voltage at the "off" conductor of each unit. This current will be impressed through line 55a on the "and" 51. The signal through conductor 50 will also shut off the "not" 59 causing a voltage in conductor 58 and preventing "and" 53 from conducting. The "and" 52 will not conduct without a signal through line 55b. The signal from "and" 51 will turn on and set memory 54.

When the trailing end of the dough piece reaches the photocell 31a, the signal through line 58a and 58 will stop. The "not" 59 will then send a signal to "and" 53 which becomes conductive and turns on memory 55 thereby setting "and" 52.

When the leading edge of the second work piece breaks the beam to the photocell 31a, the interrupted signal will allow the "and" 52 to become conductive which will start the timing cycle of the pulse width timer 57 and also shut off the signal from the "not" 56 which removes the bias from the power amplifier 39a allowing it to turn fully on. The resulting current will operate the electromagnet 30a through the power amplifier 39a. Current will continue to flow through the electromagnet 30a until the capacitor 57a of the timing circuit reaches a preset voltage at which time the current will be interrupted. The firing of the timer 57 will turn off the memory 54 and in turn shut off the memory 55. This will cause the potential in the line 55b to drop to zero thereby turning off "and" 52. When the "and" 52 is turned off, the "not" unit 56 will be turned on so as to reapply the hold-off bias to power amplifier 39a which turns off the current through the electromagnet 30a.

When the first work piece 19 continues its travel toward the left as seen in FIGURE 10, the same operation will be repeated with the lamp 33a and photocell 31b through the circuit designated 35b. This time the electromagnet 30b will be actuated thereby causing the dough pieces 19 to be placed in pairs in the troughs 46a of the indexing drum 46 as best seen in FIGURE 10.

When the memory 55 of circuit 35a is turned on, a signal will be differentiated across capacitor 50a of circuit 35b which will then set up a second logic circuit 35a in which, when photocell 31b is triggered, will repeat the same operations mentioned above. The control circuit 35b is identical to 35a except that the line 58a of the control circuit 35b is connected by a conductor 55b to the memory 55 of circuit 35a and photocell 31b is connected by the conductor 58 to "and" unit 52.

Rotation of indexing drum 46 is controlled by a magnetically operated switch 80 and a photocell 82 (FIG. 10). The photocell 82 is suitably wired to engage a clutch brake 84 of known construction with a running shaft 84a. This causes an arm 85a to rotate through 360°. When the magnetic switch 80 is again energized, the brake portion of clutch brake 84 will halt arm 85a. The rotation of arm 85 will cause the indexing drum 46 to be rotated by a pawl and ratchet assembly 86 and thereby deposit the work pieces 19 on a conveyor 88 which will be described below.

If desired, the photocell 82 can be appropriately connected to energize the clutch brake 84 each time a piece 19 falls onto the drum 46 in which event a single piece will be packed in each can.

Empty can supply mechanism

Refer now to FIGURES 1 and 8 illustrating the empty can supply mechanism indicated generally at 83. The cans 84 are brought from an overhead supply in a downward direction through a chute defined by a plurality of vertically disposed spaced apart guide bars 86. Positioned immediately above the conveyor 88 is a star wheel 83a which is allowed to rotate by means of an escapement 83b wired to a control 83c which is itself wired to a photocell 83d positioned immediately above one of the can receiving brackets and roll supporting spoons of the conveyor 88. A lamp 83e is positioned on the opposite side of the conveyor 88 from the photocell 83d. During operation when a dough piece is present in one of the dough supporting spoons of the conveyor 88, the light beam from lamp 83e to the photocell 83d will be interrupted. This will in turn cause the escapement 83b to allow the wheel 83a to rotate thereby positioning an unfilled can on the conveyor 88. The control 83c allows the indexing wheel 83a to turn sufficiently to drop an additional can 84 onto the conveyor 88 each time the light beam from lamp 83e to the photocell 83d is interrupted. Of course, if a dough piece is missing from one spoon, no can will be placed on the conveyor at that location.

Can loading mechanism

The indexing drum 46 is thus turned in the manner described above in synchronization with the movement of the longitudinally spaced upwardly opening and trough-shaped guides 87 which function as combination supporting and guiding means for the dough pieces. The guides or spoons 87 are positioned parallel to each other and extend transversely of the conveyor 88. As clearly shown in FIGURE 5, the conveyor 88 is supported upon a plurality of frame members 90 which are in turn supported upon a framework 91 composed of upright posts and cross members 93 which are rigidly connected to each other. The framework 91 includes a pair of endless chains 92 and 94 that ride upon parallel rails 96 and 98. The chains 92 and 94 include longitudinally spaced flanges 100 and 102 which project beneath hold-down strips 104 and 106 respectively that are themselves secured to the frame members 90. The chains 92 and 94 are rigidly secured to longitudinally spaced plates 108. Initially when the cans 84 drop from the can supply mechanism 83 to the brackets 88b they will be spaced somewhat from the spoons 87. However, as the conveyor chains 92 and 94 move, the closed ends of the cans will engage a guide rail 118. The guide rail 118 includes a section 118a (FIGURE 1) which converges toward the spoons 87 thereby forcing the cans over the adjacent ends of the spoons 87 to the position of FIGURE 5. The cans 84 will be held in this position by the rail 118 until after they are filled.

Upon the left end of the plates 108 is mounted a hinge 110 to which a can retaining means consisting of a supporting bracket 88b and a spoon 87 is rigidly secured. A wheel 112 is secured to the free end of each of the brackets 88b to tip the bracket 88b and spoon 87 counterclockwise after the can has been forced over the spoon when engaged by a stationary guide rail 114 to the position of FIGURE 6. It can be seen that as the dough pieces 19 in the spoons are elevated they will fall along the axis of the spoon under the influence of gravity into the open mouth of the can 84. The rail 118 then terminates allowing the filled can to fall downwardly into the can removal mechanism which will now be described.

Can removal mechanism

The filled can removal mechanism comprises a pair of endless conveyors 120 and 122 which can be seen in FIGURES 1, 6 and 8, the former being engaged over vertically positioned longitudinally spaced rolls 120a and 120b and the latter is entrained over horizontally disposed longitudinally spaced rolls 122a and 122b (FIGURE 8). The conveyor 122 acting with the permanent magnets 124 (FIGURE 6) support the cans while a plurality of parallel and vertically disposed pockets 120c of the conveyor 120 transfer the filled cans from right to left as seen in FIGURE 1 to an outlet belt conveyor 126. From the conveyor 126 the cans travel to a conventional capping machine where the tops are secured to the open ends of the cans.

The conveyors 88, 120 and 122 can be driven in any suitable manner as by means of a motor 130 (FIGURE 8) connected to shaft 132, gear boxes 134 and 136, chains 138 through 140 and gear box 142 to thereby maintain the several conveyors at the proper speeds.

It is apparent that many modifications and variations of this invention as hereinbefore set forth may be made without departing from the spirit and scope thereof. The specific embodiments described are given by way of example only and the invention is limited only by the terms of the appended claims.

We claim:
1. In a can packing apparatus:
 (a) a means for receiving a plurality of successive articles to be packaged,
 (b) a loading conveyor including guides for transferring the work pieces to the cans, the improvement comprising
 (c) a grouping assembly for placing the dough pieces on the guides in groups having a predetermined number in each group, said grouping assembly including:
  (1) a pair of vertically spaced endless flexible conveyors including a lower conveyor having cups for receiving the work pieces,

(2) the upper conveyor being positioned at the proper angle relative to the lower conveyor and being run at the proper speed whereby a point on the lower surface thereof will have a velocity component in the direction of travel of the lower conveyor equalling the speed of the lower conveyor, the work pieces being thereby conveyed to the edge of the lower conveyor opposite the cups, (3) a sensing means for detecting the presence of a work piece on the cups, (4) a means for raising the cups to engage the work pieces with the upper conveyor when the sensing means is actuated, (5) a second sensing means separated from the first sensing means by a predetermined distance for raising a successive work piece into contact with the upper conveyor, (6) and an indexing means positioned adjacent the said edge of the lower conveyor to receive the work piece and transfer said work piece to the loading conveyor.

2. A receptacle loading apparatus comprising in combination a means for receiving articles to be packaged comprising a first conveyor and a second conveyor means is mounted obliquely from the first conveyor in position to engage the upper surface of the articles that are to be packed, means on the first conveyor for raising the articles into contact with the obliquely mounted conveyor, a support and guide means on the apparatus to support the articles for movement along a predetermined axis, a means for transferring the articles from the receiving means onto the guide means, a means for placing one of said receptacles adjacent the end of each guide means, a means for transferring the articles along said axis into each receptacle position adjacent one end of the guide means and a means for conveying the filled receptacles out of the apparatus.

3. An apparatus for loading dough pieces into a receptacle comprising in combination a first conveyor for receiving the pieces of dough to be packaged; a second conveyor means is mounted obliquely from the first conveyor in position to engage the upper surface of the articles that are to be packed; means on the first conveyor for raising the articles into contact with the obliquely mounted conveyor; a loading conveyor, said loading conveyor comprising a plurality of spaced apart rotatable supports, an endless flexible member entrained over the supports, a plurality of guiding and supporting spoons mounted upon the flexible member and extending transversely thereof; means for transferring the dough pieces from the receiving conveyor to the spoons, means on the loading conveyor for tilting the spoons to a sufficiently steep angle to cause the dough pieces to slide off one end of the spoons and a bracket secured rigidly to the end of each of the spoons for supporting one of said receptacles in position to receive a dough piece as it slides from the spoon and means for permitting the filled receptacles to be removed from the apparatus.

4. A receptacle loading apparatus comprising in combination a means for receiving articles to be packaged, a support and guide means on the apparatus to support the articles for movement along a predetermined axis, said guide means comprising a spoon for supporting the article that is to be packaged and a retaining means for locating the receptacle in a fixed position relative to the spoon in position to receive the article that is to be packaged, a means for transferring the articles from the receiving means onto the guides, a means for placing one of said receptacles adjacent the end of each guide, a means for tilting the spoon and the receptacle as a single unit to transfer the articles along said axis into each receptacle positioned adjacent one end of a guide and a means for permitting transfer of filled receptacles out of the apparatus.

5. The apparatus according to claim 4 wherein the spoons are mounted on an endless conveyor, a bracket is mounted rigidly at the end of each spoon and a rail is mounted upon said apparatus in a position spaced from the spoons and adapted to engage the closed ends of the receptacles to force them onto the brackets at one end of each spoon and into a position to receive said articles when the spoons are tilted.

6. An apparatus for loading dough pieces into a receptacle comprising in combination:
  (a) a conveyor for receiving the pieces of dough to be packaged,
  (b) a loading conveyor, said loading conveyor comprising a plurality of spaced apart rotatable supports, and an endless flexible member entrained over the supports and a plurality of guiding and supporting spoons mounted upon the flexible member and extending transversely thereof,
  (c) a means for transferring the dough pieces from the receiving conveyor to the spoons and
  (d) a means on the loading conveyor for tilting the spoons to a sufficiently steep angle to cause the dough pieces to slide off one end of the spoons and
  (e) a bracket secured rigidly to the end of each of the spoons for supporting one of said receptacles in position to receive the dough piece as it slides from the spoon and
  (f) a conveyor adjacent the loading conveyor to receive the loaded receptacles for conveying the filled receptacles out of the apparatus.

References Cited
UNITED STATES PATENTS

| | | | |
|---|---|---|---|
| 2,631,767 | 3/1953 | Banks | 53—252 X |
| 2,700,496 | 1/1955 | Dickey et al. | 53—188 |
| 2,829,478 | 4/1958 | Engleson et al. | 53—251 |
| 3,027,699 | 4/1962 | Miller et al. | 53—251 X |
| 3,091,903 | 6/1963 | Kammerer | 53—253 X |
| 3,165,193 | 1/1965 | Stevenson | 198—31 |

THERON E. CONDON, Primary Examiner

N. ABRAMS, Assistant Examiner

U.S. Cl. X.R.

53—59, 73, 118, 123, 251, 255; 198—31